United States Patent [19]
Harding

[11] Patent Number: 4,875,777
[45] Date of Patent: Oct. 24, 1989

[54] OFF-AXIS HIGH ACCURACY STRUCTURED LIGHT PROFILER

[75] Inventor: Kevin G. Harding, Ann Arbor, Mich.

[73] Assignee: Industrial Technology Institute, Ann Arbor, Mich.

[21] Appl. No.: 103,497

[22] Filed: Sep. 30, 1987

[51] Int. Cl.$^4$ .............................................. G01B 11/24
[52] U.S. Cl. ......................................... 356/376; 356/1
[58] Field of Search .................................... 356/1, 376

[56] References Cited

U.S. PATENT DOCUMENTS

| | | | |
|---|---|---|---|
| 3,950,096 | 4/1976 | Aeschlimann et al. | 356/1 |
| 4,089,608 | 5/1978 | Hoadley | 356/1 |

FOREIGN PATENT DOCUMENTS

| | | | |
|---|---|---|---|
| 2306427 | 10/1976 | France | 356/376 |
| 2020418 | 11/1979 | United Kingdom | 356/376 |

*Primary Examiner*—Richard A. Rosenberger
*Attorney, Agent, or Firm*—Harness, Dickey & Pierce

[57] ABSTRACT

An optical structured light profiler for evaluating the surface shape of a workpiece along a particular cross section of interest. The profiler includes an illumination optical system which projects a sheet of light onto the workpiece surface along the cross sectional plane of interest. The viewing system has its optical axis perpendicular to the optical axis of the illumination systems such that it images the illuminated portion of the workpiece off-axis from its optical axis. In this manner the entire image illuminated on the workpiece surface is within the same depth-of-field plane of the viewing system, which provides advantages in selecting and designing the optics of the viewing system. In a first embodiment, a conventional wide angle lens is used in which only a portion of the lens is used to form an image. In accordance with a second embodiment, an optimized optical system for the viewing system is provided which images only in the off-axis region where the workpiece image is present. Many forms of the detector may be used including a two dimensional video camera or a translated linear detector array.

12 Claims, 2 Drawing Sheets

4,875,777

OFF-AXIS HIGH ACCURACY STRUCTURED LIGHT PROFILER

BACKGROUND OF THE INVENTION

This invention relates to a non-contacting optical gauging system and particularly to such a system which illuminates a target surface with a sheet of light which is evaluated to provide a characterization of the contour of the target surface.

Optical gauging systems are presently employed in industry for evaluating the profile shape of workpieces such as turbine blades, gears, helical threads, etc. These devices have inherent advantages over contacting-type mechanical gauges in that they can generally operate at greater speeds and are not subjected to mechanical wear due to direct contact with the workpiece. In one example of an optical gauge according to the prior art, a sheet of light is projected onto the object to be characterized. The illuminated portion of the object is viewed with a two-dimensional video camera or swept linear array along an axis at an angle skewed from the angle of the illumination beam. The sheet of light illuminates a profile of a cross section of the part which is viewed by the detector, just as if the part has been sliced along the light beam. Points nearer to the light source are illuminated to one side of the field-of-view of the detector, while further points are seen illuminated on the other side of the detector's field-of-view. Accordingly, such systems provide a means for evaluating the surface contour of a workpiece along a particular cross section of interest.

The above-described optical gauging techniques have a number of significant limitations. In many instances, it is desirable to evaluate a workpiece surface along a particular cross sectiom, such as perpendicular to the axis of symmetry of a turned workpiece, or along the chord of a turbine engine blade, etc. Characterizing such a cross section in one view normally requires the illuminating sheet of light to be brought in precisely along the plane of the specific cross section. To evaluate the workpiece contour, the camera views the surface at an angle from the plane of illumination with its axis intersecting the workpiece. This approach produces focus error aberrations, along with magnification errors across the surface (the so called "keystone effect") which complicates image processing. Moreover, viewing the plane of interest in this manner requires the viewing system to have a depth-of-field adequate to encompass the depth of interest, which imposes optical constraints and limitations on the measurement capacity and robustness of the data output of the system.

Alternate gauging approaches such as coordinate measuring machines (CMMs) obtain their accuracy by means of a high precision encoded translation stage which positions contacting probes. The operating speed of such systems is limited by the requirement that the machine stop and very slowly approach each measurement point so that the probes do not "crash" into the workpiece. Further, these systems have limitations in that the probe must touch the workpiece one point at a time in a serial manner. As a hybrid approach, noncontact triangulation probes have been attached to CMMs, but the measurements are still strictly done for selected individual points on the workpiece.

In view of the foregoing, there is a need to provide an optical gauging system which overcomes the depth-of-field and resolution limitations of prior art optical systems and which does not have focus error aberrations and magnification variations which can complicate data processing. It is further desirable to provide such a device which provides rapid gauging time and high measurement accuracy.

SUMMARY OF THE INVENTION

An optical gauging system achieving the above-mentioned desirable features is provided in accordance with this invention. The illumination system of this invention presents a sheet of light on the workpiece surface along the plane of the cross section of interest. The subject is evaluated by a viewing system having its optical axis perpendicular to the axis of the illumination system. In this manner, the image formed by the surface configuration of the subject illuminated by the sheet of light lies within the same depth-of-field plane of the viewing system, and accordingly, optical trade-offs inherent in providing broad depths of field are eliminated. The image provided by the viewing system is off-center from the optical axis of the viewing system lens. The detector which may be, for example, a two dimensional video camera or translated linear array, is displaced from the optical axis of the viewing system. Conventional wide angle lenses can be employed for the viewing system in which only a small portion of the lens is actually used for imaging. An optimized optical system can be provided as an alternate embodiment of this invention also having its optical axis perpendicular to the axis of the illumination system, but having optical elements present only in the regions through which light rays from the subject pass. For either form, the configuration of the viewed sheet of light is a function of only the workpiece surface configuration within the plane of interest.

Additional benefits and advantages of the present invention will become apparent to those skilled in the art to which this invention relates upon a reading of the described preferred embodiments of this invention taken in conjunction with the accompanying drawings.

DETAILED DESCRIPTION OF THE INVENTION

Figure 1:
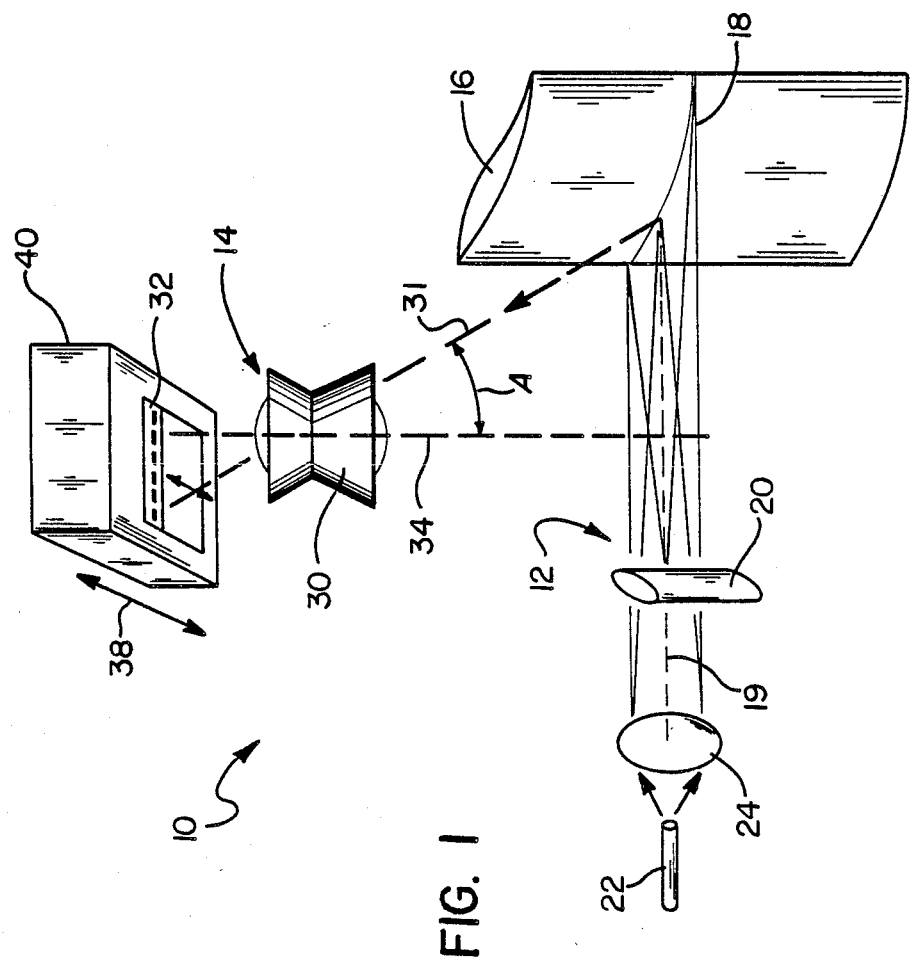
FIG. 1 is a pictorial drawing illustrating a first embodiment of the present invention in which the viewing system employs a conventional wide angle imaging lens.

An off-axis high accuracy structured light profiler in accordance with a first embodiment of this invention is shown pictorially in FIG. 1, and is generally designated there by reference number 10. Profiler 10 consists of illumination system 12 and viewing system 14 as basic elements. Profiler 10 is shown in FIG. 1 being employed to characterize the surface shape of an exemplary workpiece 16 shown as a turbine engine blade.

As shown in FIG. 1, illumination system 12 provides a sheet of light 18 along optical axis 19 which intersects workpiece 16 along the plane of interest which contains the surface section to be characterized. Various sources of light may be employed to provide sheet of light 18, such as a slit illuminated by a white light source, a mechanical scanner which sweeps a light beam across the object surface, etc. Illumination system 12 images the light source onto the cross section of interest of workpiece 16 so as to produce a narrow line width in the dimension perpendicular to that section, while defocusing or spreading out the source in the dimension which is in the plane of the section. For the embodiment of this invention illustrated in FIG. 1, sheet of light 18 is formed by cylindrical lens 20 which receives light from laser 22 after passing through focusing lens 24.

Viewing system 14 as shown in FIG. 1 principally comprises wide angle lens 30 and detector array 32. Lens 30 has its optical axis 34 (defined as the rotational center of the lens) which is perpendicular to optical axis 19 of illumination system 12. Wide angle lens 30 is selected and oriented such that the image produced from workpiece 16 does not extend to the edges of the field-of-view of the lens where degradation of the image caused by vignetting occurs. For this configuration, only a small portion of wide angle lens 30 is actually used to image sheet of light 18 from workpiece 16. For best light gathering, it would be desirable to design the system such that the angle between optical axis 34 and line of sight 31 of array 32, designated by letter A, is very large such that the direction of line of sight 31 is nearly the same as illumination systems optical axis 19. Such a high angle is, however, not practical for this embodiment. A value for angle A of between 30 and 45 degrees is consistent with available wide angle lenses which typically have a field angle of about 100 degrees (the field angle being twice the usable angle for A).

Linear detector array 32 is displaced from optical axis 34 and is moved in the direction of arrow 38 by translation stage 40. The image from the subject is sensed by detector array 32 as it is translated. Alternately, a two dimensional video camera or a single detector swept in two dimensions could be employed in place of translated array 32.

Figure 2:
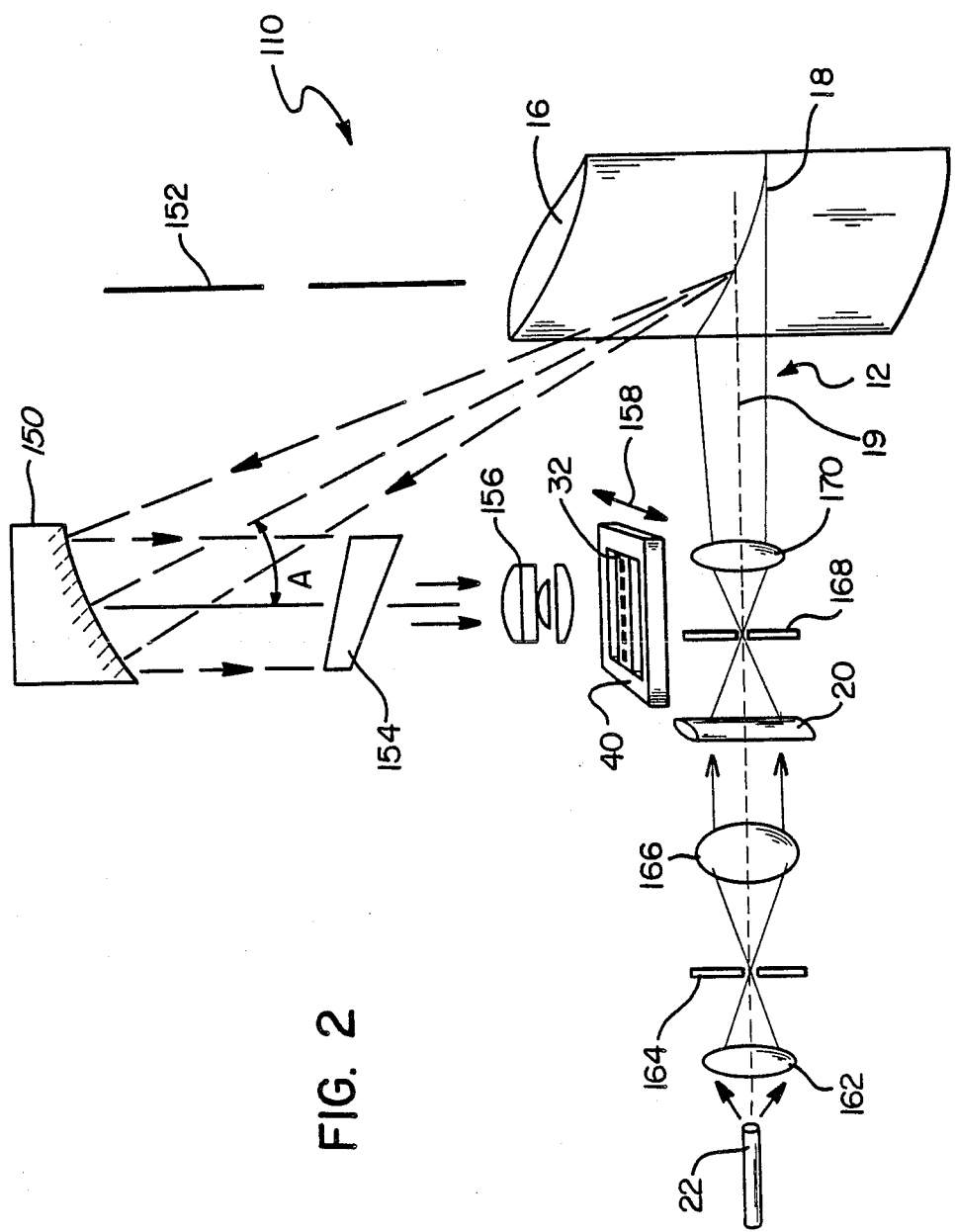
FIG. 2 is a pictorial view showing a second embodiment of the present invention in which the viewing system optics are optimized and employ a reflective mirror.

A second embodiment of an off-axis high accuracy structured light profiler is shown by FIG. 2 and is generally designated there by reference number 110. Elements of profiler 110 which perform functions identical to those of the first embodiment are identified by like reference numbers. For profiler 110, illumination system 160 is modified from that previously described to isolate the effects of beam wandering which is a characteristic of many laser sources. Beam pointing variations cause sheet of light 18 to move along the surface of workpiece 16 which generates errors in characterizing the workpiece configuration. Light from source 22 passes through lens 162 and limiting aperture 164. Lens 166 collimates the light and cylindrical lens 20 spreads it out horizontally. The light thereafter passes through aperture 168 and lens 170. Aperture 164 serves to establish a fixed reference for the light beam from laser 22 which is imaged to subject 16 by lenses 166 and 170, to present a stationary sheet of light 18 at subject 16. Aperture 168 serves to limit the cone angle of light focused on subject 16 by lens 170, and thus extends the depth-of-focus along optical axis 19 for which the sheet of light will remain a constant thickness. Although presented only for this embodiment, the described illumination system could be used in many variations including the previously described system 10 to provide isolation for laser beam pointing drift and line widths control as described.

Profiler 110 further differs from profiler 10 in that the optics of viewing system 114 are optimized such that they image only in the off-axis region where images from the illuminated subject are present. For this embodiment, a reflective off-axis mirror 150 is employed. The optical axis 152 of mirror 150, like the first embodiment, is perpendicular to optical axis 19 of the illumination system. In this case however, optical axis 152 intersects axis 19 at or near workpiece 16. Correction plate 154 and detector lens 156 image the illuminated portion of workpiece 16 onto detector array 32 (or another type of detector as previously described), which is swept in the direction of arrow 158 by translation stage 40 and functions in a manner identical to that previously described.

The viewing system of profiler 100 is equivalent to the wide angle lens based viewing system of profiler 10, but takes advantage of off-axis components. Profiler 110 effectively displaces the optical axis of the viewing system since the image is not off-center from the optical axis of lens 156. Mirror 150 focuses the image of the sheet of light 18, as seen on subject 16 at infinity. Lens 156 then views the image created by mirror 150, through correction plate 154, and does not need to be offset from the center of detector 32. Since mirror 150 creates an image at infinity, lens 156 also focuses at infinity and is infinitely corrected. Such infinitely corrected lenses are readily available. Correction plate 154 provides a single flat field in focus across the desired working field. This embodiment permits greater light gathering afforded by mirror 150, and permits the use of standard centered mounts for attachment of lens 156 to a detector or camera in position of detector 32.

Additional modifications for viewing systems according to this invention are possible, for example, margin mirrors, aspheric lenses, holographic optical elements or a catadioptric system could be used to correct the image plane by converting the off-axis view into a view along the axis of the detector.

For either of the above embodiments, the image from the subject lies within a single plane defined by illumination system optical axis 19. Since that plane is perpendicular to viewing system optical axes 34 and 152, the image is within a single depth of field plane. Accordingly, the optics of the viewing system can be optimized for a shallow depth-of-field range and oriented at best focus.

While the above description constitutes the preferred embodiments of the present invention, it will be appreciated that the invention is susceptible to modification, variation and change without departing from the proper scope and fair meaning of the accompanying claims.

I claim:

1. An optical gauging system for evaluating the surface shape of a workpiece along a cross-section comprising:

illumination means for projecting a sheet of light onto said workpiece along an illumination optical axis, viewing means for imaging said sheet of light on said workpiece having an optical axis perpendicular to said illumination optical axis and the plane defined by said sheet of light, and wherein rays of light from said workpiece surface illuminated by said sheet of light are received by said viewing means off axis with respect to said viewing means optical axis such that none of said rays are directed along said viewing means optical axis whereby said sheet of light lies within a single depth-of-field plane of said viewing means, said viewing means including an off axis concave mirror, and detector means for sensing the image of said sheet of light on said workpiece formed by said viewing means.

2. An optical gauging system according to claim 1 wherein said mirror optical axis intersects said illumination optical axis adjacent said workpiece surface.

3. An optical gauging system according to claim 1 wherein said off axis mirror focuses the image of said sheet of light as viewed on said subject at infinity, said viewing means further comprising a correction plate and one or more lenses which receive light from said off axis lens and said correction plate along their optical plate axis and presents light to said detector.

4. An optical gauging system according to claim 1 wherein said detector means comprises a linear array and a translation means for moving said array.

5. An optical gauging system according to claim 1 wherein said detector means comprises a video camera.

6. An optical gauging system according to claim 1 wherein said illumination means comprises a laser light source and a cylindrical lens for producing said sheet of light by imaging said light source with a long depth of focus.

7. An optical gauging system according to claim 6 wherein said illumination means includes an apparatus which establishes the positioning of said sheet of light thereby providing isolation from the effects of beam wandering from said laser source.

8. An optical gauging system according to claim 1 wherein said illumination means includes a laser source, a first lens for focusing the light from said laser source, a first aperture receiving the light from said first lens, a second lens for transferring the light from said first aperture in conjunction with a cylindrical lens for producing said sheet of light.

9. An optical gauging system according to claim 8 wherein said illumination means further comprises a second aperture receiving light from said cylindrical lens to limits its cone angle of said light and extending the depth-of-field of said illumination means.

10. An optical gauging system for evaluating the surface shape of a workpiece along a cross-section comprising:

illumination means for projecting a sheet of light onto said workpiece along an illumination optical axis which images a point source with a long depth of focus, viewing means for imaging said sheet of light on said workpiece having an off-axis concave mirror with an optical axis perpendicular to said illumination optical axis and wherein the rays of light from said workpiece surface illuminated by said sheet of light are received by said viewing means off axis with respect to said viewing means optical axis whereby said sheet of light lies within a single depth-of-field plane of said viewing means, and detector means for sensing the image of said sheet of light on said workpiece formed by said viewing means.

11. An optical gauging system according to claim 10 wherein said mirror optical axis intersects said illumination optical axis adjacent said workpiece surface.

12. An optical gauging system according to claim 10 wherein said concave mirror focuses the image of said sheet of light as viewed on said subject at infinity, said viewing means further comprising a correction plate and one or more lenses which receive light from said mirror and said correction plate along their optical axis and present light to said detector.

* * * * *

UNITED STATES PATENT AND TRADEMARK OFFICE
CERTIFICATE OF CORRECTION

PATENT NO. : 4,875,777
DATED : October 24, 1989
INVENTOR(S) : Kevin G. Harding

It is certified that error appears in the above-identified patent and that said Letters Patent is hereby corrected as shown below:

Column 1, line 25, "has" should be
--had--.

Column 1, line 36, "sectiom" should be
--section--.

Column 1, line 51, "capacity" should be
--capability--.

Column 5, line 25, "apparatus" should be
--aperture--.

Column 6, line 4, "limits" should be
--limit--.

Signed and Sealed this

Twelfth Day of February, 1991

Attest:

HARRY F. MANBECK, JR.

Attesting Officer

Commissioner of Patents and Trademarks